(12) United States Patent
Yamaguchi et al.

(10) Patent No.: US 11,512,212 B2
(45) Date of Patent: Nov. 29, 2022

(54) ACTINIC RADIATION-CURABLE INKJET INK AND IMAGE FORMING METHOD

(71) Applicant: Konica Minolta, Inc., Tokyo (JP)

(72) Inventors: Go Yamaguchi, Tokyo (JP); Kouji Izawa, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 299 days.

(21) Appl. No.: 16/905,456

(22) Filed: Jun. 18, 2020

(65) Prior Publication Data

US 2020/0407578 A1 Dec. 31, 2020

(30) Foreign Application Priority Data

Jun. 26, 2019 (JP) .............................. JP2019-118682

(51) Int. Cl.
| | | |
|---|---|---|
| *C09D 11/38* | (2014.01) | |
| *B41J 2/447* | (2006.01) | |
| *C09C 1/36* | (2006.01) | |
| *C09D 11/322* | (2014.01) | |

(52) U.S. Cl.
CPC .............. *C09D 11/38* (2013.01); *B41J 2/447* (2013.01); *C09C 1/3676* (2013.01); *C09C 1/3684* (2013.01); *C09D 11/322* (2013.01)

(58) Field of Classification Search
CPC ..... C09D 11/101; C09D 11/322; C09D 11/38; C09D 11/30; B32B 27/20; C08K 2003/2241
See application file for complete search history.

(56) References Cited

U.S. PATENT DOCUMENTS

| | | | | |
|---|---|---|---|---|
| 3,976,488 A | * | 8/1976 | Nihyakumen | ........... G03C 1/58 |
| | | | | 106/31.12 |
| 2008/0090930 A1 | * | 4/2008 | Madhusoodhanan | .. C09D 11/30 |
| | | | | 522/182 |
| 2009/0291215 A1 | * | 11/2009 | Makuta | .................. B41J 13/223 |
| | | | | 427/256 |
| 2010/0255211 A1 | * | 10/2010 | Kawashima | ......... C09D 11/101 |
| | | | | 522/25 |
| 2010/0327493 A1 | * | 12/2010 | Fong | ....................... G03F 7/038 |
| | | | | 264/401 |
| 2011/0269882 A1 | * | 11/2011 | Kurokawa | .............. C08L 69/00 |
| | | | | 524/161 |
| 2013/0040157 A1 | * | 2/2013 | Igarashi | .................. B32B 27/20 |
| | | | | 524/400 |
| 2019/0393404 A1 | * | 12/2019 | Kotani | ................ H01L 41/0805 |

FOREIGN PATENT DOCUMENTS

| | | |
|---|---|---|
| JP | 2009-041015 A | 2/2009 |
| JP | 2013-189566 A | 9/2013 |

* cited by examiner

*Primary Examiner* — John Zimmermann

(74) *Attorney, Agent, or Firm* — Lucas & Mercanti, LLP (57) ABSTRACT

An actinic radiation-curable inkjet ink contains an actinic radiation-polymerizable compound, surface-treated titanium oxide, and a wax. The surface-treated titanium oxide contains carbon atoms in an amount of 0.31 mass % to 2.0 mass % based on the total mass thereof.

7 Claims, 1 Drawing Sheet

ACTINIC RADIATION-CURABLE INKJET INK AND IMAGE FORMING METHOD

CROSS REFERENCE TO RELATED APPLICATIONS

The entire disclosure of Japanese Patent Application No. 2019-118682 filed on Jun. 26, 2019, is incorporated herein by reference in its entirety.

BACKGROUND

Technological Field

The present invention relates to an actinic radiation-curable inkjet ink and an image forming method.

Description of Related Art

Inkjet image forming methods are used in various fields of printing because images can be formed in a simple and inexpensive manner. One inkjet image forming method is an actinic radiation-curable inkjet image forming method in which an image is formed by causing droplets of an actinic radiation-curable inkjet ink to land on a recording medium and then irradiating the droplets with actinic radiation so that the droplets are cured to form a collection of cured films. Recently, actinic radiation-curable inkjet image forming methods have attracted attention because images with high rubfastness and adhesion can be formed on recording media that are non-absorbent to ink.

White actinic radiation-curable inkjet inks often contain titanium oxide ($TiO_2$) as a pigment. For example, Japanese Patent Application Laid-Open No. 2013-189566 discloses a nonaqueous white inkjet ink composition composed of a titanium oxide pigment surface-treated with alumina, zirconia, and an organic material, a dispersant, and an organic solvent. Japanese Patent Application Laid-Open No. 2013-189566 discloses that the surface treatment of titanium oxide with the organic material increases the affinity of the titanium oxide with the dispersant and thus increases the adsorbency of the titanium oxide for the dispersant, so that the amount of dispersant added can be reduced.

In addition, Japanese Patent Application Laid-Open No. 2009-41015 discloses a phase change ink suitable for inkjet printing processes that contains titanium dioxide, serving as a white colorant, a colorant dispersant, a curable monomer, and a gelling agent. Japanese Patent Application Laid-Open No. 2009-41015 discloses that the gelling agent can rapidly thicken and fix the ink on a substrate or other material.

SUMMARY

An actinic radiation-curable inkjet ink containing a gelling agent (wax) as disclosed in Japanese Patent Application Laid-Open No. 2009-41015 is expected to enable the formation of an image with higher definition because of its high pinning performance after landing.

However, according to the findings of the inventors, if a wax is added to an actinic radiation-curable inkjet ink containing titanium oxide, cracks may form in an image (cured film) formed from the actinic radiation-curable inkjet ink, and the smoothness of the surface of the image (cured film) may also decrease, which results in a higher likelihood of paper jams in image forming apparatuses.

The present invention has been made in view of the foregoing circumstances. An object of the present invention is to provide an actinic radiation-curable inkjet ink containing titanium oxide and a wax with a reduced tendency to form cracks in a cured film formed therefrom and a reduced decrease in the smoothness of the cured film formed therefrom, and also to provide an image forming method using such an actinic radiation-curable inkjet ink.

To achieve at least one of the abovementioned objects, according to an aspect of the present invention, an actinic radiation-curable inkjet ink reflecting one aspect of the present invention comprises an actinic radiation-polymerizable compound, surface-treated titanium oxide, and a wax, wherein the surface-treated titanium oxide contains carbon atoms in an amount of 0.31 mass % to 2.0 mass % based on a total mass thereof.

To achieve at least one of the abovementioned objects, according to another aspect of the present invention, an image forming method comprises: ejecting a droplet of the actinic radiation-curable inkjet ink from a nozzle of an inkjet head to deposit the ejected droplet on a recording medium; and irradiating the deposited droplet with actinic radiation to cure the droplet.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

According to some embodiments of the present invention, there are provided an actinic radiation-curable inkjet ink containing titanium oxide and a wax with a reduced tendency to form cracks in a cured film formed therefrom and a reduced decrease in the smoothness of the cured film formed therefrom, and an image forming method using such an actinic radiation-curable inkjet ink.

An actinic radiation-curable inkjet ink (hereinafter also simply referred to as "white ink") according to one embodiment of the present invention is an inkjet ink that contains an actinic radiation-polymerizable compound, surface-treated titanium oxide, and a wax and that cures when the actinic radiation-polymerizable compound is polymerized or crosslinked by irradiation with actinic radiation. In addition, because the white ink contains a wax, the white ink is heated and ejected in a sol state from an inkjet head, lands on a surface of a recording medium or an intermediate transfer member, and is then pinned by gelation before irradiation with actinic radiation.

The titanium oxide in the white ink is surface-treated with an organic material (the surface-treated titanium oxide is hereinafter also simply referred to as "hydrophobized $TiO_2$"). The hydrophobized $TiO_2$ contains carbon atoms in an amount of 0.31 mass % to 2.0 mass % based on the total mass thereof.

According to the findings of the inventors, fine particles of titanium oxide have a higher degree of hydrophilicity at the surface thereof than fine particles of other pigments for use in actinic radiation-curable inkjet inks (e.g., organic pigments and carbon black). Accordingly, fine particles of titanium oxide attract less hydrophobic wax in the ink than fine particles of other pigments. Thus, it is believed that, when a cured film is formed from an actinic radiation-curable inkjet ink containing titanium oxide and a wax, the wax is more broadly distributed over the region other than near the pigment in the cured film, and consequently, a relatively large amount of wax precipitates at the surface of the cured film. It is further believed that such a region where a large amount of wax is precipitated at the surface of the cured film has high hardness due to crystallized wax and thus tends to crack like scales.

In addition, a region where the fine particles of titanium oxide are exposed at the surface of the cured film or where the fine particles of titanium oxide are distributed near the surface of the cured film has a lower smoothness than other regions where the wax is present. Thus, such a region where the fine particles of titanium oxide are exposed at the surface of the cured film or where the fine particles of titanium oxide are distributed near the surface of the cured film may cause the cured film to slide less smoothly over other paper.

Accordingly, in this embodiment, titanium oxide having the surface thereof hydrophobized by surface treatment is used for the actinic radiation-curable inkjet ink. This surface treatment is believed to allow the fine particles of titanium oxide to attract more hydrophobic wax in the ink, thus reducing the amount of wax distributed over the region other than near the pigment in the cured film and therefore reducing the tendency to form cracks due to wax precipitated at the surface of the cured film. This surface treatment is also believed to allow a sufficient amount of wax to gather around the fine particles of titanium oxide exposed at the surface of the cured film or distributed near the surface of the cured film, which results in less decrease in the smoothness of the cured film due to the fine particles of titanium oxide.

On the other hand, according to the findings of the inventors, if the degree of hydrophobicity of the surface of the titanium oxide is too high, the titanium oxide attracts excess wax, which results in a decreased amount of wax precipitated at the surface of the cured film. If the amount of wax precipitated decreases, it is believed that the smoothness of the surface of the cured film decreases, which causes other recording media to slide less smoothly over the surface of the cured film (image) and thus results in a higher likelihood of paper jams in image forming apparatuses.

In view of these findings, the inventors have conducted intensive research on the surface treatment conditions under which it is possible, by surface treatment of titanium oxide for hydrophobization, to reduce the tendency to form cracks in and the decrease in the smoothness of the surface of a cured film while reducing the decrease in smoothness due to excessive hydrophobization. The inventors have found that both the tendency to form cracks and the decrease in smoothness can be reduced if titanium oxide is surface-treated so as to contain carbon atoms in an amount of 0.31 mass % to 2.0 mass % based on the total mass thereof. After conducting further research and experimentation, the inventors have completed the present invention.

An actinic radiation-curable inkjet ink (white ink) according to one embodiment of the present invention, an image forming method using the white ink, and an image forming apparatus that can perform the image forming method using the white ink will hereinafter be described in more detail.

1. White Ink
1-1. Actinic Radiation-Polymerizable Compound

There is no particular limitation as to the actinic radiation-polymerizable compound as long as the compound is polymerizable by irradiation with actinic radiation. Examples of actinic radiation-polymerizable compounds include radical polymerizable compounds and cation polymerizable compounds. Of these, the actinic radiation-polymerizable compound is preferably a radical polymerizable compound.

Examples of actinic radiation include electron beams, ultraviolet rays, $\alpha$ rays, $\gamma$ rays, and X-rays. Of these, ultraviolet rays and electron beams are preferred, and ultraviolet rays are more preferred.

The radical polymerizable compound is a radical polymerizable compound (a monomer, an oligomer, a polymer, or a mixture thereof) having an ethylenically unsaturated bond. Such radical polymerizable compounds may be used alone or in a combination of two or more thereof.

Examples of radical polymerizable compounds having an ethylenically unsaturated bond include unsaturated carboxylic acids and salts thereof, unsaturated carboxylic acid ester compounds, unsaturated carboxylic acid urethane compounds, unsaturated carboxylic acid amide compounds and anhydrides thereof, acrylonitrile, styrene, unsaturated polyesters, unsaturated polyethers, unsaturated polyamides, and unsaturated urethanes. Examples of unsaturated carboxylic acids include (meth)acrylic acid, itaconic acid, crotonic acid, isocrotonic acid, and maleic acid.

The radical polymerizable compound is preferably an unsaturated carboxylic acid ester compound, more preferably a (meth)acrylate. As used herein, "(meth)acrylate" refers to acrylate or methacrylate, and "(meth)acrylic" refers to acrylic or methacrylic.

Examples of monofunctional (meth)acrylates include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxyethylhexahydrophthalic acid, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethylsuccinic acid, 2-(meth)acryloyloxyethylphthalic acid, 2-(meth)acryloyloxyethyl-2-hydroxyethyl-phthalic acid, and t-butylcyclohexyl (meth)acrylate.

Examples of polyfunctional (meth)acrylates include difunctional (meth)acrylates, including triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A PO adduct di(meth)acrylate, neopentyl glycol hydroxypivalate di(meth)acrylate, polytetramethylene glycol di(meth)acrylate, polyethylene glycol diacrylate, and tripropylene glycol diacrylate; and tri- and higher-functional (meth)acrylates, including trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerol propoxy tri(meth)acrylate, and pentaerythritol ethoxy tetra(meth)acrylate.

The radical polymerizable compound preferably includes a (meth)acrylate modified with ethylene oxide or propylene oxide (hereinafter also simply referred to as "modified (meth)acrylate"). Such modified (meth)acrylates have a higher photosensitivity. In addition, such modified (meth) acrylates are more compatible with other components at high temperature. Furthermore, such modified (meth)acrylates cause less curing shrinkage and therefore less curl in a printed material after irradiation with actinic radiation.

Examples of cation polymerizable compounds include epoxy compounds, vinyl ether compounds, and oxetane compounds.

Examples of epoxy compounds include alicyclic epoxy resins such as 3,4-epoxycyclohexylmethyl-3',4'-epoxycyclohexane carboxylate, bis(3,4-epoxycyclohexylmethyl) adipate, vinylcyclohexene monoepoxide, s-caprolactone-modified 3,4-epoxycyclohexylmethyl-3',4'-epoxycyclohexane carboxylate, 1-methyl-4-(2-methyloxiranyl)-7-oxabicyclo[4,1,0]heptane, 2-(3,4-epoxycyclohexyl-5,5-spiro-3,4-epoxy)cyclohexanone-m-dioxane, and bis(2,3-epoxycyclopentyl) ether; aliphatic epoxy compounds, including 1,4-butanediol diglycidyl ether, 1,6-hexanediol diglycidyl ether, glycerol triglycidyl ether, trimethylolpropane triglycidyl ether, polyethylene glycol diglycidyl ether, propylene glycol diglycidyl ether, and polyether polyol polyglycidyl ethers obtained by adding one or more alkylene oxides (e.g., ethylene oxide and propylene oxide) to aliphatic polyhydric alcohols such as ethylene glycol, propylene glycol, and glycerol; and aromatic epoxy compounds, including di- and polyglycidyl ethers of bisphenol A and alkylene oxide adducts thereof, di- and polyglycidyl ethers of hydrogenated bisphenol A and alkylene oxide adducts thereof, and novolac epoxy resins.

Examples of vinyl ether compounds include monovinyl ether compounds, including ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether; and di- and trivinyl ether compounds, including ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether.

Examples of oxetane compounds include 3-hydroxymethyl-3-methyloxetane, 3-hydroxymethyl-3-ethyloxetane, 3-hydroxymethyl-3-propyloxetane, 3-hydroxymethyl-3-n-butyloxetane, 3-hydroxymethyl-3-phenyloxetane, 3-hydroxymethyl-3-benzyloxetane, 3-hydroxyethyl-3-methyloxetane, 3-hydroxyethyl-3-ethyloxetane, 3-hydroxyethyl-3-propyloxetane, 3-hydroxyethyl-3-phenyloxetane, 3-hydroxypropyl-3-methyloxetane, 3-hydroxypropyl-3-ethyloxetane, 3-hydroxypropyl-3-propyloxetane, 3-hydroxypropyl-3-phenyloxetane, 3-hydroxybutyl-3-methyloxetane, 1,4-bis{[(3-ethyl-3-oxetanyl)methoxy]methyl}benzene, 3-ethyl-3-(2-ethylhexyloxymethyl)oxetane, and di[1-ethyl (3-oxetanyl)]methyl ether.

The actinic radiation-polymerizable compound is preferably present in an amount of 1 mass % to 97 mass %, more preferably 10 mass % to 95 mass %, even more preferably 30 mass % to 95 mass %, based on the total mass of the white ink.

1-2. Actinic Radiation Polymerization Initiator

The white ink may contain an actinic radiation polymerization initiator.

The actinic radiation polymerization initiator is a compound that initiates polymerization and crosslinking of the actinic radiation-polymerizable compound upon irradiation with actinic radiation. The white ink may contain no actinic radiation polymerization initiator if the polymerization and crosslinking of the actinic radiation-polymerizable compound can be initiated without an actinic radiation polymerization initiator, for example, if an image is formed by irradiation with electron beams.

The actinic radiation polymerization initiator may be a radical initiator if the white ink contains a radical polymerizable compound, or may be a cation initiator (photoacid generator) if the white ink contains a cation polymerizable compound.

Radical polymerization initiators include intramolecular bond cleavage type radical polymerization initiators and intramolecular hydrogen abstraction type radical polymerization initiators.

Examples of intramolecular bond cleavage type radical polymerization initiators include acetophenone-based initiators, including diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl) ketone, 1-hydroxycyclohexyl-phenyl ketone, 2-methyl-2-morpholino(4-methylthiophenyl)propan-1-one, and 2-benzyl-2-dimethylamino-1-(4-morpholinophenyl)-butanone; benzoins, including benzoin, benzoin methyl ether, and benzoin isopropyl ether; acylphosphine oxide-based initiators, including 2,4,6-trimethylbenzoin diphenylphosphine oxide; and benzil and methylphenyl glyoxyester.

Examples of intramolecular hydrogen abstraction type radical polymerization initiators include benzophenone-based initiators, including benzophenone, methyl o-benzoylbenzoate, 4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone, and 3,3'-dimethyl-4-methoxybenzophenone; thioxanthone-based initiators, including 2-isopropylthioxanthone, 2,4-dimethylthioxanthone, 2,4-diethylthioxanthone, and 2,4-dichlorothioxanthone; aminobenzophenone-based initiators, including Michler's ketone and 4,4'-diethylaminobenzophenone; 10-butyl-2-chloroacridone; 2-ethylanthraquinone; 9,10-phenanthraquinone; and camphorquinone.

Examples of cation-based polymerization initiators include photoacid generators. Examples of photoacid generators include $B(C_6F_5)_4^-$, $PF_6^-$, $AsF_6^-$, $SbF_6^-$, and $CF_3SO_3^-$ salts of aromatic onium compounds containing cations such as diazonium, ammonium, iodonium, sulfonium, and phosphonium; sulfonates that generate sulfonic acid; halides that photogenerate hydrogen halides; and iron arene complexes.

The amount of actinic radiation polymerization initiator can be set to any amount in the range in which the white ink cures sufficiently upon irradiation with actinic radiation and the ejectability of the white ink does not decrease significantly. For example, the white ink may contain the actinic radiation polymerization initiator in an amount of 0.1 mass % to 10 mass %, more preferably 0.1 mass % to 8 mass %, based on the total mass thereof.

1-3. Hydrophobized $TiO_2$

The hydrophobized $TiO_2$ is titanium oxide ($TiO_2$) surface-treated so as to contain carbon atoms in an amount of 0.31 mass % to 2.0 mass % based on the total mass thereof.

If the amount of carbon atoms is 0.31 mass % or more, the hydrophobized $TiO_2$ attracts more wax, thus reducing the amount of wax precipitated at the surface of a cured film and therefore resulting in a lower tendency to form cracks. In addition, if the amount of carbon atoms is 0.31 mass % or more, a sufficient amount of wax gathers around the hydrophobized $TiO_2$ exposed at the surface of the cured film or distributed near the surface of the cured film, thus further reducing the decrease in smoothness due to the titanium oxide. If the amount of carbon atoms is 2.0 mass % or less, the hydrophobized $TiO_2$ does not attract excess wax, and the amount of wax precipitated at the surface of the cured film can be maintained, thus reducing the decrease in the smoothness of the surface of the cured film. To reduce both the tendency to form cracks and the decrease in smoothness, it is preferred that the amount of carbon atoms be 0.36 mass % to 1.0 mass %, more preferably 0.4 mass % to 0.8 mass %.

The amount of carbon atoms can be determined by a combustion method.

The surface treatment may be surface treatment with a known surface treatment agent.

Although there is no particular limitation as to the surface treatment agent as long as the amount of carbon atoms present in the hydrophobized $TiO_2$ can be controlled within the above range, the surface treatment agent may bean organic surface treatment agent, preferably a polyol, a siloxane compound, or a silane coupling agent. Of these, the surface treatment agent is preferably a siloxane compound to allow the hydrophobized $TiO_2$ to attract more wax and thereby more efficiently reduce the tendency to form cracks and the decrease in smoothness.

Examples of polyols include polyols having 4 to 10 carbon atoms. Examples of polyols having 4 to 10 carbon atoms include ethylene glycol, 2-methyl-1,2,3-propanetriol, pentaerythritol, trimethylolethane, and trimethylolpropane.

Examples of siloxane compounds include various silicone oils, including methyl hydrogen polysiloxane, dimethyl polysiloxane, and methyl phenyl polysiloxane.

Examples of silane coupling agents include various alkylsilanes, including methyltrimethoxysilane, ethyltrimethoxysilane, hexyltrimethoxysilane, octyltrimethoxysilane, decyltrimethoxysilane, octadecyltrimethoxysilane, dimethyldimethoxysilane, octyltriethoxysilane, and n-octadecyldimethyl(3-(trimethoxysilyl)propyl)ammonium chloride; various fluoroalkylsilanes, including trifluoromethylethyltrimethoxysilane and heptadecafluorodecyltrimethoxysilane; vinyltrimethoxysilane; and γ-aminopropyltrimethoxysilane.

Other examples of surface treatment agents include various metal-based coupling agents, including titanium-based, aluminum-based, and alumina-zirconia-based coupling agents; fatty acids and salts thereof, including isostearic acid and stearic acid; and known surfactants.

The titanium oxide can be surface-treated by a known method. For example, titanium oxide particles, a surface treatment agent, and a solvent may be mixed in a stirring mill, and the solvent may then be removed. Before the mixing, the titanium oxide particles, the surface treatment agent, and the solvent may be premixed to prepare a slurry.

The hydrophobized $TiO_2$ is typically in particle form. The hydrophobized $TiO_2$ preferably has a weight average particle size of 50 nm to 500 nn, more preferably 100 nm to 300 nn. If the hydrophobized $TiO_2$ has a weight average particle size of 50 nm or more, an image with sufficient hiding power can be formed. On the other hand, if the hydrophobized $TiO_2$ has a weight average particle size of 500 nm or less, the hydrophobized $TiO_2$ can be stably dispersed, thus increasing the storage stability and ejection stability of the white ink.

Although the crystal form of the titanium oxide may be any of the rutile, anatase, and brookite forms, the anatase form, which has low specific gravity, is preferred to obtain hydrophobized $TiO_2$ with a smaller particle size, whereas the rutile form, which has a high refractive index in the visible light region, is preferred to further increase the hiding power of an image formed therefrom.

The hydrophobized $TiO_2$ is preferably present in an amount of 5 mass % to 30 mass %, more preferably 8 mass % to 20 mass %, based on the total mass of the white ink.

1-4. Wax

The wax is a compound that has 1 to 4 alkyl chains and that allows the white ink to undergo a sol-gel phase change in response to a temperature change. The wax allows the white ink to under solation when heated and to undergo gelation around room temperature. Thus, the white ink is heated to undergo solation and is ejected from an inkjet head, and upon landing on a recording medium, the white ink is cooled and presolidified by gelation, so that the pinning performance of the white ink can be increased.

The wax is preferably a compound that dissolves in the actinic radiation-polymerizable compound present in the white ink at a temperature higher than the gelation temperature of the white ink and that crystallizes in the white ink at a temperature lower than or equal to the gelation temperature of the white ink. "Gelation temperature" refers to the temperature at which, as the white ink is cooled from a heated sol or liquid state, the white ink undergoes a sol-gel phase transition and exhibits a rapid change in viscosity. Specifically, the gelation temperature of the white ink can be determined as the temperature at which, as the white ink is cooled from a sol or liquid state, the viscosity of the white ink increases rapidly as measured with a rheometer (e.g., MCR300 manufactured by Anton Paar).

As the wax crystallizes in the white ink, a structure in which the actinic radiation-polymerizable compound is contained within three-dimensional spaces formed by plate-like crystals of the wax may be formed (this structure is hereinafter referred to as "card house structure"). If the card house structure is formed, the liquid actinic radiation-polymerizable compound is retained within the above spaces. This results in less spread of dots formed by depositing the white ink on a recording medium, thus further increasing the pinning performance of the ink. If the pinning performance of the ink increases, dots formed by depositing the ink on a recording medium are less likely to combine together.

To facilitate formation of the card house structure, it is preferred that the actinic radiation-polymerizable compound and the wax be compatible with each other in the white ink.

Examples of waxes include higher fatty acids, higher alcohols, fatty acid esters, fatty acid amines, fatty ketones, and fatty acid amides.

Of these, the wax is preferably a fatty acid ester or a fatty ketone, more preferably a compound represented by general formula (G1) or a compound represented by general formula (G2):

R1-CO—R2  general formula (G1)

R3-COO—R4  general formula (G2)

where R1 and R2 in general formula (G) each independently represent a linear or branched hydrocarbon group having 9 to 25 carbon atoms, and R3 and R4 in general formula (G2) each independently represent a linear or branched hydrocarbon group having 9 to 25 carbon atoms.

Examples of compounds represented by general formula (G1) include dilignoceryl ketone (C24-C24), dibehenyl ketone (C22-C22), distearyl ketone (C18-C18), dieicosyl ketone (C20-C20), dipalmityl ketone (C16-C16), dimyristyl ketone (C14-C14), dilauryl ketone (C12-C12), lauryl myristyl ketone (C12-C14), lauryl palmityl ketone (C12-C16), myristyl palmityl ketone (C14-C16), myristyl stearyl ketone (C14-C18), myristyl behenyl ketone (C14-C22), palmityl stearyl ketone (C16-C18), palmityl behenyl ketone (C16-C22), and stearyl behenyl ketone (C18-C22). The numbers of carbon atoms in each pair of parentheses represent the respective numbers of carbon atoms in the two hydrocarbon groups separated by the carbonyl group.

Examples of commercial products of compounds represented by general formula (G1) include 18-Pentatriacontanon and Hentriacontan-16-on (both manufactured by Alfa Aesar) and KAO WAX T1 (manufactured by Kao Corporation).

Examples of compounds represented by general formula (G2) include behenyl behenate (C21-C22), eicosyl eicosanoate (C19-C20), stearyl stearate (C17-C8), palmityl stearate (C7-C16), lauryl stearate (C7-C12), cetyl palmitate (C15-C16), stearyl palmitate (C15-C8), myristyl myristate (C13-C14), cetyl myristate (C13-C16), octyldodecyl myristate (C13-C20), stearyl oleate (C17-C8), stearyl erucate (C21-C18), stearyl linoleate (C7-C8), behenyl oleate (C18-C22), and arachidyl linoleate (C17-C20). The numbers of carbon atoms in each pair of parentheses represent the respective numbers of carbon atoms in the two hydrocarbon groups separated by the ester group.

Examples of commercial products of compounds represented by general formula (G2) include UNISTER M-2222SL, Spermaceti, NISSAN ELECTOL WEP-2, and NISSAN ELECTOL WEP-3 (all manufactured by NOF Corporation; "UNISTER" and "NISSAN ELECTOL" are both registered trademarks of NOF Corporation); EXEPARL SS and EXEPARL MY-M (both manufactured by Kao Corporation; "EXEPARL" is a registered trademark of Kao Corporation); EMALEX CC-18 and EMALEX CC-10 (manufactured by Nihon Emulsion Co., Ltd.; "EMALEX" is a registered trademark of Nihon Emulsion Co., Ltd.); and AMREPS PC (manufactured by Kokyu Alcohol Kogyo Co., Ltd.; "AMREPS" is a registered trademark of Kokyu Alcohol Kogyo Co., Ltd.). Since these commercial products are often mixtures of two or more species, they may optionally be separated and purified before incorporation into the white ink.

The amount of wax can be set to any amount in the range in which the pinning performance of the white ink increases sufficiently and the ejectability of the white ink does not decrease significantly. For example, the white ink preferably contains the wax in an amount of 0.3 mass % to 8.0 mass %, more preferably 0.5 mass % to 5.0 mass %, even more preferably 0.8 mass % to 3.5 mass %, based on the total mass thereof.

In addition, the wax is preferably present in an amount of 5 mass % to 30 mass %, more preferably 7.5 mass % to 25 mass %, even more preferably 10 mass % to 20 mass %, based on the amount of hydrophobized $TiO_2$. If the amount of wax is 5 mass % or more based on the amount of hydrophobized $TiO_2$, the ejectability of the white ink does not tend to decrease because the amount of hydrophobized $TiO_2$ is not excessive, and the pinning performance of the white ink tends to increase sufficiently because the amount of wax is sufficient. In particular, if the amount of wax is 7.5 mass % or more, or 10 mass % or more, based on the amount of hydrophobized $TiO_2$, the white ink contains a sufficient amount of wax, so that a sufficient amount of wax gathers around the hydrophobized $TiO_2$ exposed at the surface of a cured film or distributed near the surface of the cured film, thus further reducing the decrease in smoothness due to the titanium oxide. If the amount of wax is 30 mass % or less based on the amount of hydrophobized $TiO_2$, the hydrophobized $TiO_2$ attracts a sufficient amount of the wax present in the white ink and allows less wax to precipitate at the surface of the cured film, thus effectively reducing the tendency to form cracks.

1-5. Other Components

The white ink may further contain other components such as surfactants, polymerization inhibitors, pH adjusters, ultraviolet absorbers, and humectants. In addition, the white ink may optionally contain pigments other than the hydrophobized $TiO_2$.

The other components are preferably present in an amount of 0.001 mass % to 10 mass % based on the total mass of the white ink.

1-6. Physical Properties

To further increase the ejectability from an inkjet head, the white ink preferably has a viscosity of 3 mPa·s to 20 mPa·s at 80° C.

The white ink preferably has a phase transition temperature, at which the white ink undergoes a sol-gel phase transition, of 40° C. to 70° C. If the white ink has a phase transition temperature of 40° C. or higher, the white ink thickens quickly upon landing on a recording medium, thus facilitating adjustment of the degree of spread. If the white ink has a phase transition temperature of 70° C. or lower, the white ink does not easily undergo gelation during ejection from an ejection head, in which the composition temperature is typically about 80° C., so that the white ink can be more stably ejected.

The viscosity at 80° C. and phase transition temperature of the white ink can be determined by measuring, with a rheometer, the change in the dynamic viscoelasticity of the white ink with temperature.

1-7. Method for Preparing White Ink

The white ink can be prepared by mixing together the components described above. During this process, the components are preferably mixed together with heating to increase the solubility of the components.

Alternatively, a pigment dispersion containing hydrophobized $TiO_2$, other optional pigments, and a pigment dispersant may be prepared in advance, and the remaining components may then be added and mixed together. In this case, the pigment dispersion is preferably prepared by mixing together the pigment and other components such as the pigment dispersant with heating to increase the solubility of the components such as the pigment dispersant.

2. Image Forming Method

An image forming method according to another embodiment of the present invention relates to a method for forming an image using the white ink. The image forming method can be performed in the same manner as a conventionally known image forming method using an inkjet ink except that the white ink is used.

Specifically, the image forming method includes 1) ejecting the white ink from a nozzle of an inkjet head to deposit the ejected droplets on a recording medium; and 2) irradiating the droplets of the white ink deposited on the recording medium with actinic radiation to cure the droplets of the white ink.

2-1. Deposition Step

In the first step, droplets of the white ink are ejected from an inkjet head and are deposited at the positions corresponding to the image to be formed on a recording medium.

The ejection system of the inkjet head may be either an on-demand system or a continuous system. The on-demand inkjet head may be an electromechanical conversion system such as a single-cavity system, a double-cavity system, a bender system, a piston system, a shear mode system, or a shared-wall system, or may be an electrothermal conversion system such as a thermal inkjet system or a Bubble Jet ("Bubble Jet" is a registered trademark of Canon Inc.) system.

In addition, the inkjet head may be either a scanning inkjet head or a line inkjet head, preferably a line inkjet head.

The white ink is heated into a sol state and is then ejected as droplets from the inkjet head. To increase the ejectability of the white ink from the inkjet head, it is preferred to set the temperature of the white ink charged into the inkjet head to 10° C. to 30° C. above the gelation temperature of the white ink. If the temperature of the white ink in the inkjet head is 10° C. or more above the gelation temperature, a decrease in ejectability due to the gelation of the white ink in the inkjet head or on the nozzle surfaces is unlikely to occur. On the other hand, if the temperature of the white ink in the inkjet head is 30° C. or less above the gelation temperature, the degradation of the components at high temperature is unlikely to occur. In addition, the viscosity of the white ink during ejection is preferably 7 mPa·s to 15 mPa·s, more preferably 8 mPa·s to 13 mPa·s.

There is no particular limitation as to the method for heating the white ink. For example, at least one part, such as a piezoelectric head, an ink tank forming a head carriage, an ink supply system such as a supply pipe or a front ink tank immediately before the head, or a pipe equipped with a filter, can be heated with, for example, a panel heater, a ribbon heater, or warm water.

The droplet volume of the white ink during ejection is preferably 2 pL to 20 pL to further increase the recording speed and the image quality.

There is no particular limitation as to the recording medium, and common uncoated paper and coated paper, YUPO Synthetic Paper ("YUPO" is a registered trademark of Yupo Corporation), and various plastics and films thereof for use in soft packaging can be used. Examples of various plastic films include PP films, PET films, OPS films, OPP films, ONy films, PVC films, PE films, and TAC films. Other plastics such as polycarbonates, (meth)acrylic resins, ABS, polyacetal, PVA, and rubbers can also be used. The recording medium may also be made of other materials such as metal and glass.

The white ink may be deposited on the recording medium by causing the ejected white ink to land directly on the recording medium or by causing the ejected white ink to land on an intermediate transfer member to form an intermediate image and then transferring the intermediate image from the intermediate transfer member to the recording medium.

2-2. Curing Step

In the second step, the droplets of the white ink deposited on the recording medium in the first step are irradiated with actinic radiation to cure the droplets. Thus, an image composed of a cured film of the white ink is formed.

The actinic radiation can be selected from, for example, electron beams, ultraviolet rays, $\alpha$ rays, $\gamma$ rays, and X-rays, preferably ultraviolet rays or electron beams. The ultraviolet rays are preferably light having a peak wavelength of 360 nm to 410 nm. In addition, the ultraviolet rays are preferably emitted from an LED light source. LEDs radiate less heat than conventional light sources (e.g., metal halide lamps). Thus, LEDs do not easily melt the ink upon irradiation with actinic radiation and are therefore less likely to cause problems such as uneven gloss.

3. Image Forming Apparatus

An image forming apparatus according to still another embodiment of the present invention is an inkjet image forming apparatus that can perform the method described above.

Figure 1:
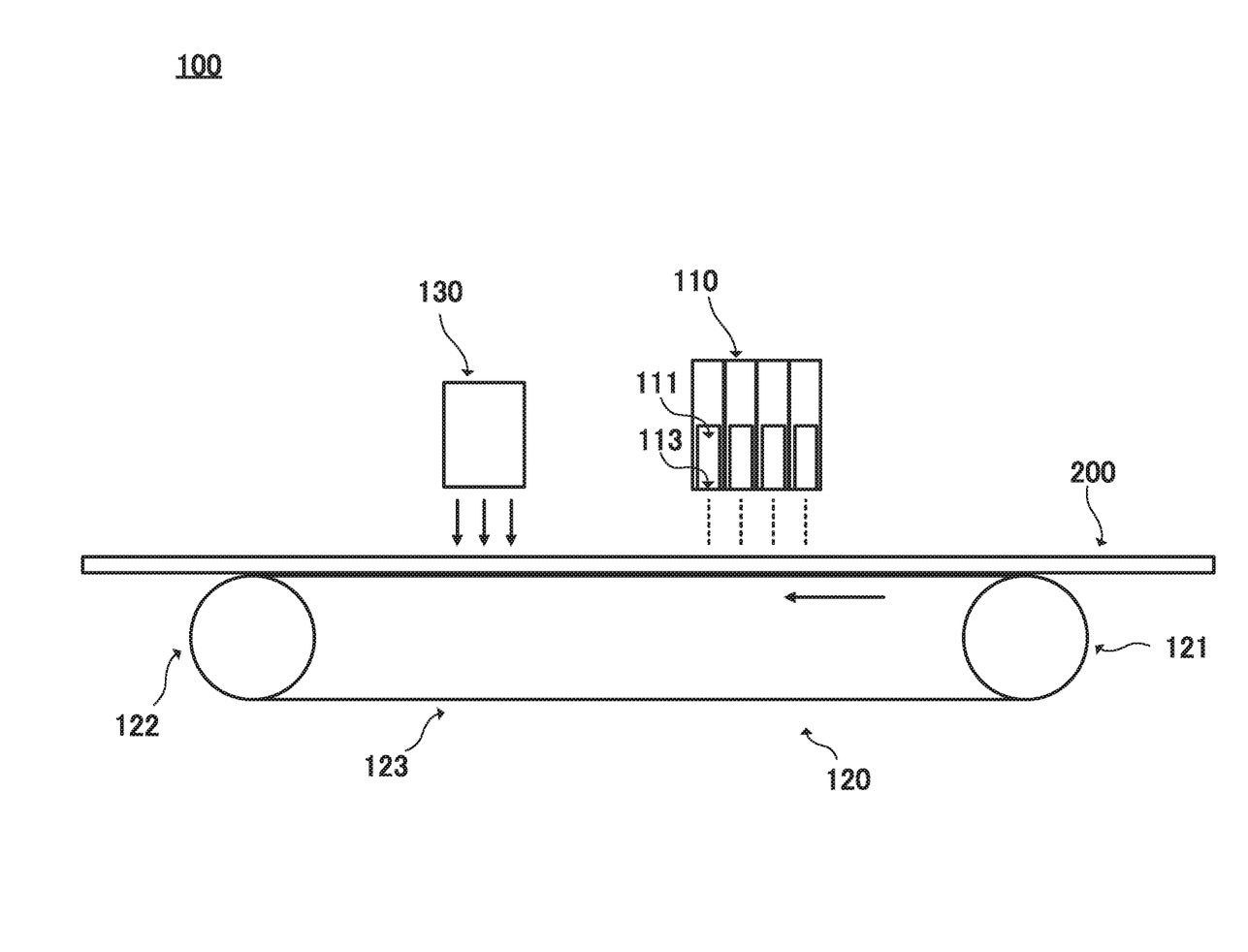
FIG. 1 is a side view illustrating the concept of an inkjet image forming apparatus according to one embodiment of the present invention.

FIG. 1 is a side view illustrating the concept of inkjet image forming apparatus 100 according to this embodiment.

As shown in FIG. 1, image forming apparatus 100 includes inkjet head 110, transport section 120, and irradiation section 130. In FIG. 1, the arrow indicates the transport direction of recording medium 200.

3-1. Inkjet Head 110

Inkjet head 110 has nozzle surfaces 113 in which orifices of nozzles 111 are provided in a surface that is opposed to transport section 120 when an image is formed. Inkjet head 110 ejects the white ink toward recording medium 200 being transported by transport section 120. To increase the ejectability of the white ink, inkjet head 110 may include a temperature controller for controlling the temperature of the ink so that the ink has low viscosity. Examples of temperature controllers include panel heaters, ribbon heaters, and warm-water heaters.

Inkjet head 110 may be a scanning inkjet head that is narrower than recording medium 200 in the direction perpendicular to the transport direction of recording medium 200 or may be a line inkjet head that is wider than recording medium 200 in the direction perpendicular to the transport direction of recording medium 200.

Nozzles 111 have orifices in nozzle surfaces 113. The number of nozzles 111 may be greater than or equal to the number of inks used for image formation (e.g., four). If inkjet head 110 has a plurality of nozzles 111, the plurality of nozzles 111 are preferably arranged at nearly equal intervals in the transport direction of recording medium 200 to simplify the apparatus configuration and facilitate control.

Inkjet head 110 is configured such that the amount of ink ejected and landing on recording medium 200 can be changed. For example, inkjet head 110 is configured such that, under the control of a control section, the amplitude of vibration of the piezoelectric elements can be changed, or the ejection of ink from some nozzles can be stopped.

3-2. Transport Section 120

When an image is formed, transport section 120 transports recording medium 200 opposed to inkjet head 110 such that recording medium 200 moves immediately under inkjet head 110 in the vertical direction. For example, transport section 120 includes drive roller 121, driven roller 122, and transport belt 123.

Drive roller 121 and driven roller 122 are disposed at a predetermined distance from each other in the transport direction of recording medium 200 so as to extend in the direction perpendicular to the transport direction of recording medium 200. Drive roller 121 is rotated by a drive source (not shown).

Transport belt 123 is a belt for transporting recording medium 200 placed thereon and is looped around drive roller 121 and driven roller 122. Transport belt 123 may be, for example, an endless belt formed so as to be wider than recording medium 200. In this case, as the drive source rotates drive roller 121, transport belt 123 circulates with the rotation of drive roller 121 to transport recording medium 200 placed thereon.

3-3. Irradiation Section 130

Irradiation section 130 includes alight source and irradiates the top side of transport section 120 with actinic radiation from the light source. Thus, the droplets of the white ink that have landed on recording medium 200 being transported can be irradiated with actinic radiation to cure the droplets. Irradiation section 130 can be disposed immediately over transport section 120 downstream of inkjet head 110.

3-4. Other Configuration

In addition to the configuration described above, image forming apparatus 100 may include an ink tank (not shown) for storing the white ink before ejection, an ink channel (not shown) through which the ink tank and inkjet head 110 communicate with each other so that the ink can flow therebetween, and a control section (not shown) that controls the operation of inkjet head 110, transport section 120, and irradiation section 130.

In addition, image forming apparatus 100 may include an intermediate transfer member and a transfer section (both not shown). In this case, inkjet head 110 ejects the white ink toward the intermediate transfer member such that the white ink lands on the surface of the intermediate transfer member to form an intermediate image composed of a collection of droplets of the white ink on the surface of the intermediate transfer member. Thereafter, the transfer section transfers the intermediate image from the surface of the intermediate transfer member to the surface of recording medium 200. Irradiation section 130 then irradiates the intermediate image transferred to the surface of recording medium 200 with actinic radiation to cure the droplets of the white ink.

EXAMPLES

Specific examples of the embodiments will hereinafter be described together with comparative examples. The following examples, however, are not intended to limit the technical scope of the invention within the scope of these examples.

1. Preparation of Actinic Radiation-Curable Inkjet Inks 1-1. Surface Treatment of Titanium Oxide and Measurement of Amount of Carbon Atoms A slurry prepared by introducing 3.0 parts by mass of methyltrimethoxysilane, serving as a surface treatment agent, and 97.0 parts by mass of untreated titanium oxide (R32 manufactured by Sakai Chemical Industry Co., Ltd.) into a solvent was mixed with a stirrer and was further subjected to dispersion treatment in a horizontal continuous sand grinder mill (ULTRAVISCOMILL manufactured by Aimex Co., Ltd.) for 5 minutes. After the dispersion treatment, the mixture was introduced into a kneader and was heated under reduced pressure to remove the solvent. Thereafter, the resulting powder was cured at 120° C. to 150° C. to obtain a powder of surface-treated titanium oxide, namely, $TiO_2$-1.

$TiO_2$-2 to $TiO_2$-9 were obtained in the same manner except that the type and amount of pretreatment agent and the amount of untreated titanium oxide were changed.

The amounts of carbon atoms present in $TiO_2$-1 to $TiO_2$-9 obtained as described above were measured by a combustion/thermal conductivity detection (TCD) method with a Vario EL Cube manufactured by Elementar under the following conditions:

Measurement item: CHNS simultaneous measurement
Combustion tube temperature: 1,150° C.
Reduction tube temperature: 850° C.
Carrier gas: helium
Carrier gas flow rate: 230 mL/min.
Oxygen flow rate (for combustion): 40 mL/min.

Table 1 shows the types and amounts of surface treatment agents used for surface treatment, the amounts of surface-treated titanium oxide, and the measured amounts of carbon atoms for $TiO_2$-1 to $TiO_2$-9.

TABLE 1

| Surface-treated titanium oxide No. | Raw materials | | Titanium oxide Amount (parts by mass) | Amount of carbon atoms (mass %) |
|---|---|---|---|---|
| | Surface treatment agent | | | |
| | Type | Amount (parts by mass) | | |
| 1 | Methyltrimethoxysilane | 3.0 | 97.0 | 0.31 |
| 2 | Methyltrimethoxysilane | 3.5 | 96.5 | 0.36 |
| 3 | Methyltrimethoxysilane | 9.6 | 90.4 | 1.0 |
| 4 | Methyltrimethoxysilane | 19.2 | 80.8 | 2.0 |
| 5 | Polydimethylsiloxane | 1.1 | 98.9 | 0.31 |
| 6 | Trimethylolpropane | 0.7 | 99.3 | 0.31 |
| 7 | Trimethylolpropane | 0.35 | 99.3 | 0.31 |
| | Trimethylolethane | 0.35 | | |
| 8 | Methyltrimethoxysilane | 1.9 | 98.1 | 0.2 |
| 9 | Methyltrimethoxysilane | 24.0 | 76.0 | 2.5 |

1-2. Preparation of Titanium Oxide Dispersions

A mixture was prepared by placing 40 parts by mass of 3PO-modified trimethylolpropane triacrylate and 10 mass % of AJISPER PB824 (manufactured by Ajinomoto Fine-Techno Co., Inc.), serving as a pigment dispersant, in a stainless steel beaker. The mixture was heated on a hot plate at 65° C. with stirring for 1 hour.

Thereafter, the mixture was cooled to room temperature, and 50 parts by mass of $TiO_2$-1 was further added. The mixture was then placed and sealed into a glass bottle together with 200 g of zirconia beads with a diameter of 0.5 mm and was subjected to dispersion treatment with a paint shaker for 5 hours, followed by removing the zirconia beads to obtain Titanium Oxide Dispersion-1.

Titanium Oxide Dispersion-2 to Titanium Oxide Dispersion-9 were obtained in the same manner except that $TiO_2$-2 to $TiO_2$-9 were used instead of $TiO_2$-1.

A mixture was prepared by placing 60 parts by mass of 3PO-modified trimethylolpropane triacrylate and 10 mass % of AJISPER PB824 (manufactured by Ajinomoto Fine-Techno Co., Inc.), serving as a pigment dispersant, in a stainless steel beaker. The mixture was heated on a hot plate at 65° C. with stirring for 1 hour.

Thereafter, the mixture was cooled to room temperature, and 30 parts by mass of Pigment Black 7 (#52 manufactured by Mitsubishi Chemical Corporation) was further added. The mixture was then placed and sealed into a glass bottle together with 200 g of zirconia beads with a diameter of 0.5 mm and was subjected to dispersion treatment with a paint shaker for 5 hours, followed by removing the zirconia beads to obtain Carbon Black Dispersion-10.

1-3. Preparation of Actinic Radiation-Curable Inkjet Inks

The above pigment dispersions were mixed with the materials listed below according to the compositions shown in Table 2 and were heated to and stirred at 80° C. Thereafter, the mixtures were filtered through an ADVANTEC 3 m Teflon ("Teflon" is a registered trademark of the Chemours company) membrane filter with heating to obtain actinic radiation-curable inkjet inks, namely, Inks 1 to 12. The values in the table are mass %.

Actinic Radiation-Polymerizable Compound-1: 4EO-modified hexanediol diacrylate

Actinic Radiation-Polymerizable Compound-2: tripropylene glycol diacrylate

Actinic Radiation-Polymerizable Compound-3: 6EO-modified trimethylolpropane triacrylate Actinic Radiation Polymerization Initiator-1: DUROCUR TPO (manufactured by BASF)

Actinic Radiation Polymerization Initiator-2: IRGACURE 819 (manufactured by BASF)

Surfactant: BYK UV3500 (manufactured by BYK-Chemie Japan K.K.)

Polymerization inhibitor: Irgastab UV10 (manufactured by BASF)

Wax-1: NISSAN ELECTOL WEP-2 (manufactured by NOF Corporation)

Wax-2: dipentadecyl ketone (Hentriacontan-16-on manufactured by Alfa Aesar)

B: Fine cracks were observed in part of the surface of the image under a microscope at 100× magnification, but no cracks were visible to the naked eye.

C: Fine cracks were observed over the entire surface of the image under a microscope at 100× magnification, but no cracks were visible to the naked eye.

D: Cracks were visible to the naked eye.

2-2. Surface Smoothness

The dynamic friction coefficient of an image formed in the same manner as in the crack resistance test described above was calculated from the change in the value of a force gauge (manufactured by Imada Co., Ltd.) read when a test specimen was moved over the image at constant speed under a load of 500 g. The test specimen used was a 25 mm×25 mm aluminum-deposited PET sheet (SPECIALITIES No. 314-400 manufactured by Gojo Paper Mfg. Co., Ltd.). Based on the resulting dynamic friction coefficient, the surface smoothness was evaluated according to the following criteria:

A: The dynamic friction coefficient was less than 0.1.

B: The dynamic friction coefficient was 0.1 to less than 0.15.

TABLE 2

| Ink No. | | 1 | 2 | 3 | 4 | 5 | 6 | 7 | 8 | 9 | 10 | 11 | 12 |
|---|---|---|---|---|---|---|---|---|---|---|---|---|---|
| Titanium | 1 | 30 | — | — | — | — | — | — | — | 20 | 30 | — | — |
| oxide | 2 | — | 30 | — | — | — | — | — | — | — | — | — | — |
| dispersion | 3 | — | — | 30 | — | — | — | — | — | — | — | — | — |
| | 4 | — | — | — | 30 | — | — | — | — | — | — | — | — |
| | 5 | — | — | — | — | 15 | — | — | — | — | — | — | — |
| | 6 | — | — | — | — | — | 15 | — | — | — | — | — | — |
| | 7 | — | — | — | — | — | — | 15 | — | — | — | — | — |
| | 8 | — | — | — | — | — | — | — | — | — | 30 | — | — |
| | 9 | — | — | — | — | — | — | — | — | — | — | 30 | — |
| Carbon black dispersion | 10 | | | | | | | | | | | | 15 |
| Actinic radiation- | 1 | 10 | 10 | 10 | 10 | 10 | 10 | 10 | 10 | 10 | 10 | 10 | 10 |
| polymerizable | 2 | 22 | 22 | 22 | 22 | 22 | 22 | 22 | 22 | 22 | 22 | 22 | 22 |
| compound | 3 | 28.2 | 28.2 | 28.2 | 28.2 | 43.7 | 43.7 | 43.7 | 40.7 | 30.2 | 29.7 | 29.7 | 43.7 |
| Actinic radiation | 1 | 2 | 2 | 2 | 2 | 4 | 4 | 4 | 4 | 2 | 2 | 2 | 4 |
| polymerization initiator | 2 | 2.5 | 2.5 | 2.5 | 2.5 | 2.5 | 2.5 | 2.5 | 2.5 | 1 | 1 | 1 | 2.5 |
| Surfactant | | 0.1 | 0.1 | 0.1 | 0.1 | 0.1 | 0.1 | 0.1 | 0.1 | 0.1 | 0.1 | 0.1 | 0.1 |
| Polymerization inhibitor | | 0.2 | 0.2 | 0.2 | 0.2 | 0.2 | 0.2 | 0.2 | 0.2 | 0.2 | 0.2 | 0.2 | 0.2 |
| Wax | 1 | 2 | 2 | 2 | 2 | 1 | 1 | 2 | 0.3 | 2.7 | 3 | 3 | 1 |
| | 2 | 3 | 3 | 3 | 3 | 1.5 | 1.5 | 0.5 | 0.2 | 1.8 | 2.0 | 2.0 | 1.5 |

2. Evaluation 2-1. Crack Resistance

Inks 1 to 12 were each charged into a single-pass inkjet image forming apparatus including an inkjet head having piezoelectric inkjet nozzles. The ink supply system was composed of an inkjet head, an ink tank, an ink channel, an ink subtank immediately before the inkjet head, and a pipe equipped with a filter. The temperature of the inkjet head was set to 80° C.

The inkjet head included ahead module having a set of two inkjet heads (piezoelectric type) manufactured by Konica Minolta, Inc., each with a resolution of 600 dpi (i.e., a total of 1,200 dpi).

Each of Inks 1 to 12 was ejected from the nozzles of the inkjet head such that the ink landed on an aluminum-deposited PET sheet (SPECIALITIES No. 314-400 manufactured by Gojo Paper Mfg. Co., Ltd.). The landed ink was cured by irradiation with an LED lamp (395 n, 8 W/cm², manufactured by Phoseon Technology) within 1 second after landing.

The thus-formed solid image (16 cm×4 cm) with a coating weight of 10 g/m² was observed under a microscope and with the naked eye and was evaluated for crack resistance according to the following criteria:

A: No cracks were observed in the surface of the image under a microscope at 100× magnification.

C: The dynamic friction coefficient was 0.15 to less than 0.2.

D: The dynamic friction coefficient was 0.2 or more.

The evaluation results for Inks 1 to 12 are shown in Table 3.

TABLE 3

| Ink No. | Crack resistance | Surface smoothness |
|---|---|---|
| 1 | C | B |
| 2 | B | B |
| 3 | B | B |
| 4 | A | C |
| 5 | B | A |
| 6 | C | B |
| 7 | C | B |
| 8 | B | C |
| 9 | B | B |
| 10 | D | D |
| 11 | A | D |
| 12 (reference example) | A | A |

As is obvious from Table 3, the use of Inks 1 to 9, which were actinic radiation-curable inkjet inks which contained an actinic radiation-polymerizable compound, surface-treated titanium oxide, and a wax and in which the surface-treated titanium oxide contained carbon atoms in an amount of 0.31 mass % to 2.0 mass % based on the total mass thereof, allowed the formation of an image with a lower tendency to form cracks and a reduced decrease in the smoothness of the surface of the cured film. Ink 12, which contained a pigment other than titanium oxide (carbon black), did not cause the problem of cracking or the decrease in the smoothness of the surface of the cured film.

In addition, Inks 2 and 3, in which the surface-treated titanium oxide contained carbon atoms in an amount of 0.36 mass % to 1.0 mass % based on the total mass thereof, exhibited a better balance between crack resistance and the smoothness of the surface of the cured film than Inks 1 and 4.

In addition, Ink 5, in which the surface-treated titanium oxide was surface-treated with a siloxane compound, exhibited better crack resistance and smoothness of the surface of the cured film than Inks 6 and 7. This is probably because the titanium oxide surface-treated with the siloxane compound attracted more wax.

In addition, Inks 8 and 9, in which the wax was present in an amount of 5 mass % to 30 mass % based on the amount of surface-treated titanium oxide, exhibited a lower tendency to form cracks. This is probably because the surface-treated titanium oxide attracted a sufficient amount of the wax present in the ink and thus allowed less wax to precipitate at the surface of the cured film.

In contrast, the image formed from Ink 10, in which the fine titanium oxide particles contained only a small amount of carbon atoms, i.e., 0.2 mass %, exhibited a higher tendency to form cracks. This is probably because the titanium oxide attracted less wax and thus caused more wax to precipitate at the surface.

In addition, the image formed from Ink 11, in which the fine titanium oxide particles contained a large amount of carbon atoms, i.e., 2.5 mass %, exhibited a decrease in the smoothness of the surface of the cured film. This is probably because the hydrophobized titanium oxide attracted excess wax and thus allowed little wax to precipitate at the surface of the cured film.

The actinic radiation-curable inkjet ink according to the present invention has a lower tendency to form cracks in an image formed therefrom and is less likely to cause paper jams in image forming apparatuses. Thus, the present invention is expected to broaden the range of applications of actinic radiation-curable inkjet inks, particularly to the formation of white solid images such as those for underlayers, thus contributing to advances in and widespread use of technology in this field.

Although embodiments of the present invention have been described in detail, the disclosed embodiments are made for purposes of illustration and example only and not limitation. The scope of the present invention should be interpreted by terms of the appended claims.

What is claimed is:

1. An actinic radiation-curable inkjet ink, comprising an actinic radiation-polymerizable compound, surface-treated titanium oxide, and a wax,
    wherein the surface-treated titanium oxide contains carbon atoms in an amount of 0.31 mass % to 2.0 mass % based on a total mass thereof.

2. The actinic radiation-curable inkjet ink according to claim 1, wherein the titanium oxide is surface-treated with a surface treatment agent selected from the group consisting of polyols, siloxane compounds, and silane coupling agents.

3. The actinic radiation-curable inkjet ink according to claim 1, wherein the wax is present in an amount of 5 mass % to 30 mass % based on an amount of the surface-treated titanium oxide.

4. The actinic radiation-curable inkjet ink according to claim 1, wherein the surface-treated titanium oxide contains carbon atoms in an amount of 0.36 mass % to 1.0 mass % based on the total mass thereof.

5. The actinic radiation-curable inkjet ink according to claim 1, wherein the titanium oxide is surface-treated with a siloxane compound.

6. The actinic radiation-curable inkjet ink according to claim 1, wherein the wax includes a compound represented by general formula (G1) or a compound represented by general formula (G2):

R1-CO—R2  general formula (G1)

R3-COO—R4  general formula (G2)

where R1 and R2 in general formula (G1) each independently represent a linear or branched hydrocarbon group having 9 to 25 carbon atoms, and R3 and R4 in general formula (G2) each independently represent a linear or branched hydrocarbon group having 9 to 25 carbon atoms.

7. An image forming method, comprising:
    ejecting a droplet of the actinic radiation-curable inkjet ink according to claim 1 from a nozzle of an inkjet head to deposit the ejected droplet on a recording medium; and
    irradiating the deposited droplet with actinic radiation to cure the droplet.

* * * * *